United States Patent
Horton

(10) Patent No.: US 8,583,533 B2
(45) Date of Patent: Nov. 12, 2013

(54) SYSTEM, METHOD, ARTICLE FOR FACILITATING DERIVATIVES TRANSACTIONS

(71) Applicant: Leonard Horton, Seattle, WA (US)

(72) Inventor: Leonard Horton, Seattle, WA (US)

(73) Assignee: Direct Swap Inc., Carson City, NV (US)

( * ) Notice: Subject to any disclaimer, the term of this patent is extended or adjusted under 35 U.S.C. 154(b) by 0 days.

(21) Appl. No.: 13/631,546

(22) Filed: Sep. 28, 2012

(65) Prior Publication Data

US 2013/0085966 A1   Apr. 4, 2013

Related U.S. Application Data

(60) Provisional application No. 61/540,958, filed on Sep. 29, 2011.

(51) Int. Cl.
*G06Q 40/00* (2012.01)

(52) U.S. Cl.
USPC ........................................ 705/36 R

(58) Field of Classification Search
USPC .................................................. 705/35–40
See application file for complete search history.

(56) References Cited

U.S. PATENT DOCUMENTS

2007/0239591 A1* 10/2007 May ................................ 705/37
2012/0215720 A1* 8/2012 Hough ......................... 705/36 R

* cited by examiner

*Primary Examiner* — Olabode Akintola
(74) *Attorney, Agent, or Firm* — Seed IP Law Group PLLC

(57) ABSTRACT

A derivatives transaction service is provided and includes qualifying prospective users of the service based on a user type and credit evaluation, determining approved transaction types for qualified users, identifying approved risk mitigation methods for qualified users; enrolling qualified users in the service; and providing to a qualified user services such as transaction search services; transaction offer services; portfolio management services; and transaction negotiation services. The service may be provided using one or more configured computing systems.

23 Claims, 13 Drawing Sheets

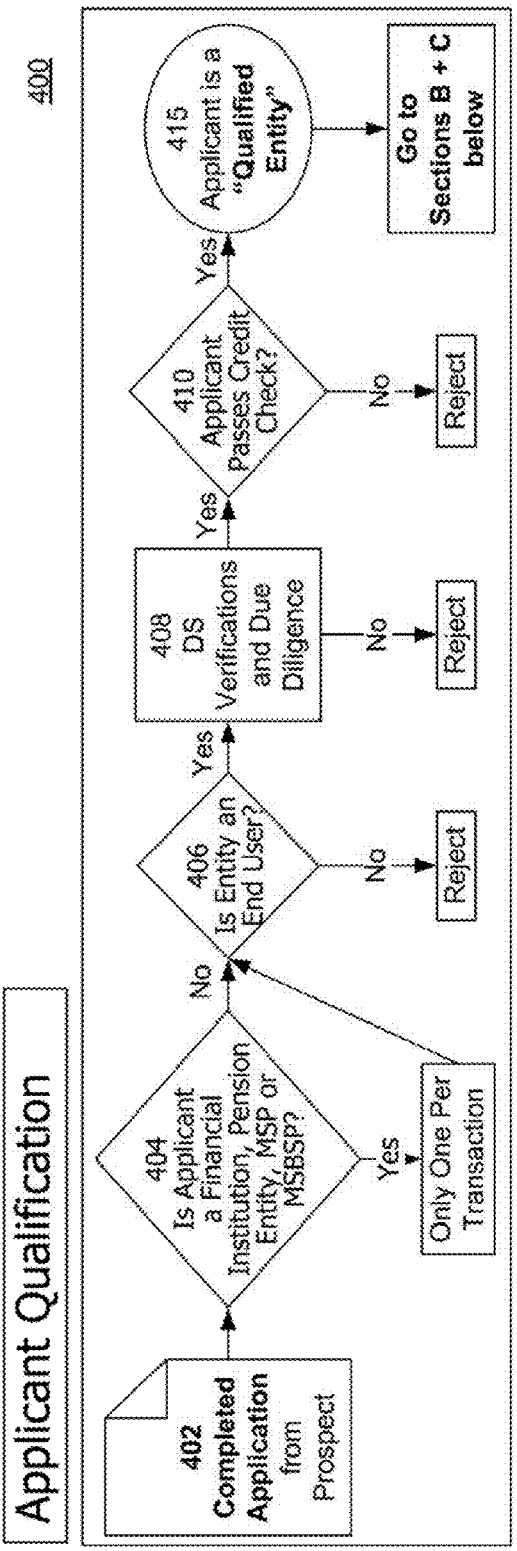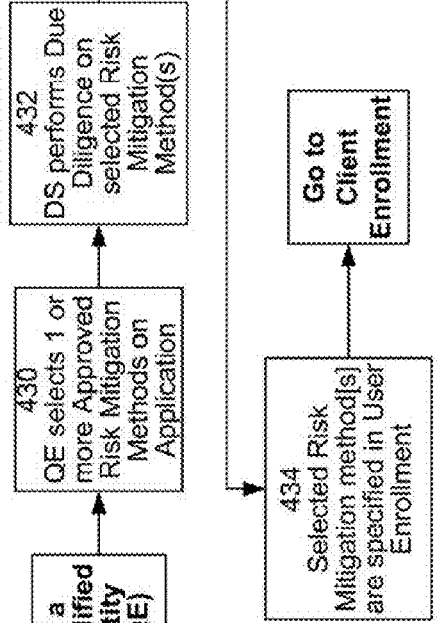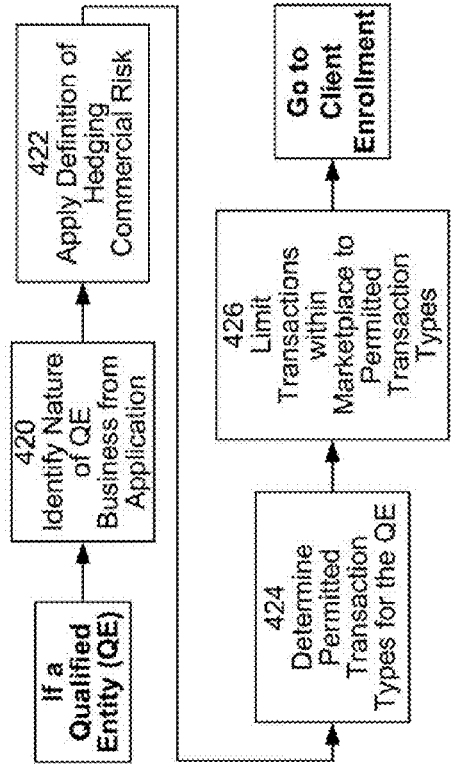
FIG. 4

SYSTEM, METHOD, ARTICLE FOR FACILITATING DERIVATIVES TRANSACTIONS

BACKGROUND

1. Technical Field

The present disclosure is directed to systems, methods and articles to facilitate derivatives transactions.

2. Description of the Related Art

Derivatives are financial instruments whose value depends on—or derives from—certain external variables. Those variables may be underlying assets, such as stocks or commodities, or some other metric, such as weather, unemployment or an economic index, etc. Derivatives commonly take the form of contracts, such as futures, options or swaps.

Derivatives may be broadly categorized by (i) the relationship between the asset and the derivative (e.g., forwards, options, swaps), the type of underlying asset (e.g., equities, foreign exchange, interest rates, commodities), and (iii) the market or manner in which they trade or are transacted. Forwards are a contract to buy or sell an asset at a future date for a set price. Futures are similar to forwards, except standardized contracts are used and futures may be traded on exchanges. Options give a holder the right, but not the obligation, to buy or sell an asset. Swaps are contracts to exchange cash flows on or before a specified future date based on the underlying value of the external variable.

The major classes of underlying assets include interest rates, foreign exchange rates (currency), credit default, commodities, equity securities, etc.

Generally speaking, derivatives transactions may be purely speculative in nature or may be used for commercial risk management purposes, such as hedging transactions. Speculative derivatives transactions can take an almost infinite number of forms, and may greatly magnify gains and losses relative to a transaction in the underlying asset. Hedging transactions may improve the operations and profitability of an operating business.

Derivatives transactions typically are either exchange traded, or traded over-the-counter. Exchange trades generally use standardized contracts defined by the exchange, which acts as an intermediary in the transaction. Over-the-Counter (OTC) transactions are privately negotiated transactions directly between two parties with or without an intermediary, and are often of a non-standard type. OTC transactions are generally arranged by banks or other financial institutions.

BRIEF SUMMARY

In an embodiment, a system comprises: one or more memories; and one or more processing devices configured to automatically provide a derivatives transactions service, the automatically providing the derivatives transaction service including: qualifying prospective users of the service based on a user type and credit evaluation; determining approved transaction types for qualified users; identifying approved risk mitigation methods for qualified users; enrolling qualified users in the service; and providing to a qualified user at least one of: transaction search services; transaction offer services; portfolio management services; and transaction negotiation services. In an embodiment, providing the derivative transaction service includes providing a private marketplace to qualified users to conduct transactions. In an embodiment, providing the private market place includes providing credit support services. In an embodiment, the credit support services comprise due diligence credit support services (e.g., verifying information related to a proposed credit support mechanism, such a letter of credit). In an embodiment, providing the derivative transaction service includes selectively providing a qualified user with an indication of information related to a counter party of a potential transaction. In an embodiment, providing the derivative transaction service includes providing due diligence services. In an embodiment, providing the private marketplace comprises providing social connection services to users of the private marketplace. In an embodiment, providing the derivative transaction service comprises providing online access to the derivative transaction service. In an embodiment, providing the derivative transaction service comprises verifying compliance with a regulatory scheme. In an embodiment, the verifying compliance comprises verifying compliance with a Dodd Frank End User Clearing Exception (EUCE). In an embodiment, the verifying compliance with the EUCE comprises verifying a transaction is exempt from clearing and margin requirements of the regulatory scheme. In an embodiment, providing the derivative transaction service comprises reporting to comply with a regulatory scheme. In an embodiment, the reporting includes reporting to comply with a Dodd Frank End User Clearing Exception. In an embodiment, providing the derivative transaction service comprises providing collateral management services and analytic tools.

In an embodiment, a computer implemented method of providing a derivatives transaction service comprises: qualifying prospective users of the service based on a user type and credit evaluation; determining approved transaction types for qualified users; identifying approved risk mitigation methods for qualified users; enrolling qualified users in the service; and providing to a qualified user at least one of: transaction search services; transaction offer services; portfolio management services; and transaction negotiation services. In an embodiment, the qualifying, the determining, the enrolling and the providing are performed by one or more configured computing systems. In an embodiment, providing the derivative transaction service includes providing a private marketplace to qualified users to conduct transactions. In an embodiment, providing the private market place includes providing due diligence credit support services. In an embodiment, providing the derivative transaction service includes selectively providing a qualified user with an indication of information related to a counter party of a potential transaction. In an embodiment, the indication is an identity of the counter party. In an embodiment, providing the derivative transaction service includes providing due diligence services. In an embodiment, providing the private marketplace comprises providing social connection services to users of the private marketplace. In an embodiment, providing the derivative transaction service comprises providing online access to the derivative transaction service. In an embodiment, providing the derivative transaction service comprises verifying compliance with a regulatory scheme. In an embodiment, the verifying compliance comprises verifying compliance with a Dodd Frank End User Clearing Exception (EUCE). In an embodiment, the verifying compliance with the EUCE comprises verifying a transaction is exempt from clearing and margin requirements of the regulatory scheme. In an embodiment, providing the derivative transaction service comprises generating reports to comply with a regulatory scheme. In an embodiment, the generated reports includes reports to comply with a Dodd Frank End User Clearing Exception. In an embodiment, providing the derivative transaction service comprises providing collateral management services and analytic tools.

In an embodiment, a non-transitory computer-readable medium's contents cause a computing system to perform a method, the method comprising: qualifying prospective users of a derivatives transaction service based on a user type and credit evaluation; determining approved transaction types for qualified users; identifying approved risk mitigation methods for qualified users; enrolling qualified users in the service; and providing to a qualified user at least one of: transaction search services; transaction offer services; portfolio management services; and transaction negotiation services. In an embodiment, the contents are instructions which configure at least one processing device of the computing system to perform the method. In an embodiment, the method comprises one or more of the methods described herein.

In an embodiment, a system comprises: means for qualifying prospective users of a derivatives transaction service based on a user type and credit evaluation; means for determining approved transaction types for qualified users; means for identifying approved risk mitigation methods for qualified users; means for enrolling qualified users in the service; and means for providing to a qualified user at least one of: transaction search services; transaction offer services; portfolio management services; and transaction negotiation services.

An embodiment facilitates providing a private marketplace of qualified participants conducting transactions with known credit support mechanisms. In an embodiment, a participant qualification process allows clients access to information regarding a counterparty to a potential transaction, reducing transaction risks. In an embodiment, the information includes the identity of the counterparty. In an embodiment, credit support due diligence reduces credit risks associated with uncleared transactions. In an embodiment, the marketplace forms a community with access to different kinds of social connection opportunities between participants in the marketplace. In an embodiment, online delivery and a highly automated process are employed, reducing transaction fees. In an embodiment, business processes and platform mechanics facilitate compliance with the Dodd Frank End User Clearing Exception to except transactions from the mandatory clearing and margin requirements of the Dodd Frank Act. In an embodiment, regulatory reporting necessary for compliance with the Dodd Frank End User Clearing Exception is performed for a client of the marketplace. In an embodiment, the system includes a comprehensive suite of tools, such as collateral management and analytic tools. In an embodiment, some of the tools may be proprietary to a service provider.

BRIEF DESCRIPTION OF THE SEVERAL VIEWS OF THE DRAWING(S)

FIG. 4 is a process flow process diagram of an embodiment of a method of qualifying prospective users of a derivatives transactions service.

DETAILED DESCRIPTION

Figure 1:
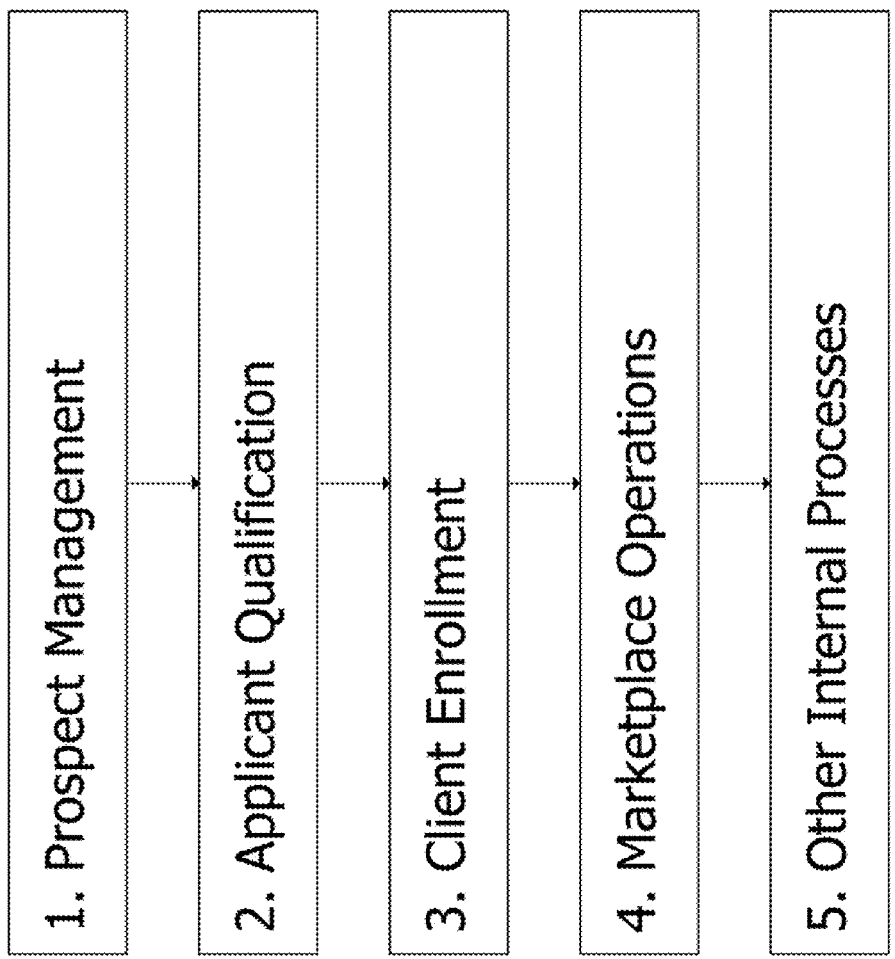
FIG. 1 is a high level process flow diagram of an embodiment of a method for performing derivatives transactions.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, devices such as computing systems, telecommunication networks, web browsers, web servers, etc., and financial transactions have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claimed invention.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

The following discussion provides a brief, general description of a suitable computing environment in which the embodiments described herein may be implemented. Although not required, various embodiments will be described in the general context of computer-executable instructions, such as program application modules, objects, or macros being executed by one or more electronic devices, such as a personal computer, a server, a smart phone, etc., and various combinations thereof. Those skilled in the relevant art will appreciate that various embodiments can be practiced with other computing system configurations, including other handheld devices, multiprocessor systems, microprocessor-based or programmable consumer electronics, networked personal computers (PCs), minicomputers, mainframe computers, virtual systems, and the like. Various embodiments can be practiced in distributed computing environments where tasks or modules are performed by remote processing devices, which are linked through a communications network. In a distributed computing environment, program modules may be located in both local and remote memory storage devices.

The figures as illustrated show a particular derivatives transaction service provider, Direct Swap sometimes referred to in the figures as DS. Embodiments as described herein may be employed by any derivatives transactions service provider, and the illustrations are not meant to limit the disclosure to particular embodiments.

FIG. 1 is a high-level process flow diagram of an embodiment of a method of facilitating derivatives transactions, such as commercial hedging transactions. The method as illustrated comprises five processes: prospect management 1, applicant qualification 2, client enrollment 3, marketplace operations 4, and other internal processes 5, examples of each of which are set forth on FIGS. 3-8 respectively, and discussed in more detail below. Embodiments of methods and systems of facilitating derivatives transactions may provide significant advantages to qualified users, such as reducing transaction costs (for example, by charging lower fees, flat rates, percentages, etc.) and facilitating compliance with regulatory schemes (for example, by facilitating compliance with the "End-User Clearing Exception" contained in the Dodd-Frank Wall Street Reform and Consumer Protection Act, etc.).

Historically, OTC derivatives transactions have been minimally regulated in the United States. However, recent regulations have been enacted imposing new and highly complex regulations on OTC derivatives transactions, including mandatory clearing. There are two major exceptions to the mandatory clearing requirement: transactions conducted pursuant to the End-User Clearing Exception (EUCE) and certain categorical exceptions as to type or class. Embodiments of a system and method for facilitating derivatives transactions may take advantage of these exceptions, such as the EUCE, etc., or other exceptions, such as future exceptions, exceptions in other regulatory schemes, etc. Some embodiments may limit the type of transactions (for example, excluding certain asset classes of transactions, e.g., allowing OTC derivatives transactions, excluding equity derivatives, excluding certain credit default contracts) or the participants (for example, allowing corporate end-users and excluding speculators), for example, in order to qualify for the EUCE. The filtering processes employed may exclude, for example, trades which would subject participants to margin requirements.

Participants in the system may be subject to qualification. For example, in order to gain access to and conduct transactions with an embodiment of a derivatives transaction system, prospective users may be required to submit an application and undergo a qualification process. This gate-keeping function may, for example, serve to ensure compliance with applicable laws, such as the Dodd-Frank Act generally and the EUCE more specifically. In addition to performing basic due diligence, the qualification process may also seek to understand and evaluate the forms of transaction assurance proposed by the applicant.

Embodiments may also operate in accordance with a common set of rules which facilitate allowing end-users to conduct transactions in a regularized manner. Users may be required to agree to such rules. Criteria may be employed to define the risk to be hedged, and to ensure compliance with regulatory schemes, such as the EUCE. For example, an embodiment may automatically limit the types of transactions that a user can enter into to those that fall within the definition of hedging commercial risk for a particular user's business. For example, an airline may be permitted to hedge the cost of jet fuel, but not the cost of pork bellies, as the former is germane to the business but not the latter. Uniform contracts and agreements may also be provided and/or required, for example to facilitate execution of deals reached in the marketplace and to foster predictable outcomes, subject to performance by the counterparty.

Embodiments may provide a real-time electronic marketplace to permit users to exchange the information necessary to seek other transaction participants, propose and/or evaluate potential hedging transactions, efficiently negotiate terms and reach agreement. Embodiments may allow users to aggregate and manage their hedging transactions (including in some embodiments transactions conducted outside the embodiment), and may allow users to view real-time transaction data on exchange-traded swaps when evaluating or negotiating a transaction using an embodiment of the derivatives transaction facilitating system. Embodiments may be accessed, for example, using the Internet and a client portal with authentication techniques. Embodiments may automate compliance reporting requirements, such as notifications regarding how a party meets its financial obligations in an uncleared swap, or notifications for users required to report each transaction, etc.

Embodiments may include performance monitoring. For example, registered users may be required to report the results of each transaction after it is completed. Embodiments may compile and retain such performance information as part of an historical profile of each user. Such information may be made available to other users, for example to reduce fraud and/or encourage self-regulation by users.

Embodiments of derivatives transactions systems may employ different fee mechanisms. For example, fixed or variable fees may be charged to qualify participants, for monthly use of the system, for each transaction, etc.

Figure 2:
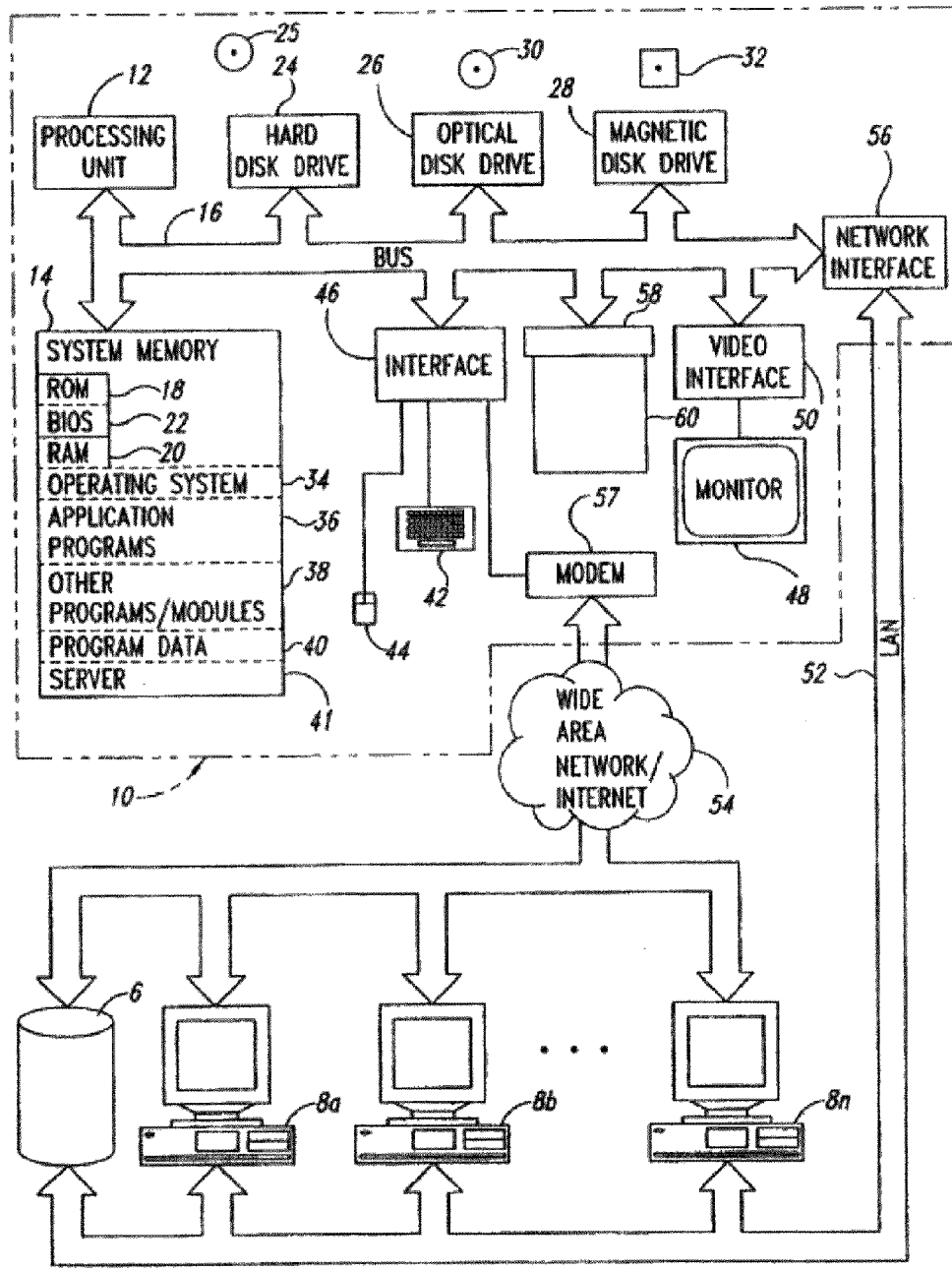
FIG. 2 is a functional block diagram of an embodiment of an environment suitable for providing derivatives transactions services.

FIG. 2 shows an embodiment of an environment 200 that may be employed to facilitate derivatives transactions as described herein. The environment 200 includes a computing system 10. For example, the computing system 10 may be configured as a user computing system, such as a computing system of a member of a sales force, a host server, such as a financial transactions server, a communications server, etc. The computing system 10 may, for example, be operated by a service providing financial services and related goods and services to a consumer, by a consumer purchasing such goods or services from a service, by a vendor, such as a telecom service provider, an Internet service provider, etc. The computing system 10 may take the form of any of the variety of types discussed above, which may run a networking client, for example a server, a Web browser, etc. The computing system 10 comprises a processor unit 12, a system memory 14 and a system bus 16 that couples various system components including the system memory 14 to the processing unit 12. The processing unit 12 may be any logical processing unit, such as one or more central processing units (CPUs), digital signal processors (DSPs), application-specific integrated circuits (ASIC), etc. Unless described otherwise, the construction and operation of the various blocks shown in FIG. 2 are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 10, such as during startup.

The computing system 10 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers coupled between such drives and the bus 16, as is known by those skilled in the relevant art, for example via an IDE (Integrated Drive Electronics) interface. The drives 24, 26 and 28, and their associated computer-readable media, provide nonvolatile storage of computer-readable instructions, data structures, program modules and other data for the computing system 10. Although the depicted computing system 10 employs hard disk 25, optical disk 30 and magnetic disk 32, those skilled in the relevant art will appreciate that other types of spinning media memory computer-readable media may be employed, such as, digital video disks (DVD), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34 (for example, Windows™, Android™, etc), one or more application programs 36, other programs or modules 38, and program data 40. The system memory 14 also includes a server 41 for permitting the computing system 10 to exchange data with sources such as Websites of the Internet, corporate intranets, or other networks, as well as other server applications on server computers. The server 41 may be markup language based, such as hypertext markup language (HTML), and operate with markup languages that use syntactically delimited characters added to the data of a document to represent the structure of the document, etc.

While shown in FIG. 2 as being stored in the system memory 14, the operating system 34, application programs 36, other program modules 38, program data 40 and server 41 can be stored on the hard disk 25 of the hard disk drive 24, the optical disk 30 and the optical disk drive 26 and/or the magnetic disk 32 of the magnetic disk drive 28. A user can enter commands and information to the computing system 10 through input devices such as a keypad or keyboard 42 and a pointing device such as a mouse 44. Other input devices can include a microphone, joystick, game pad, scanner, touch screen, card reader, chip reader, etc. These and other input devices as illustrated are connected to the processing unit 12 through an interface 46 such as a serial port interface that couples to the bus 16, although other interfaces such as a parallel port, a game port or a universal serial bus (USB) can be used. A display or monitor 48 or other display devices may be coupled to the bus 16 via video interface 50, such as a video adapter. The computing system 10 can include other output devices such as speakers, printers, etc.

The computing system 10 can operate in a networked environment using logical connections to one or more repositories 6 and/or other computing systems 8a-8n. The computer system 10 may employ any known means of communications, such as through a local area network (LAN) 52 or a wide area network (WAN), a telecommunications network or the Internet 54. Such networking environments are well known and may include, for example, any type of telecommunications network or other network, such as CDMA, OFDMA, GSM, WiMAX, VoIP, WiFi, Internet Protocol, various IEEE standard protocols, etc.

When used in a LAN networking environment, the computing system 10 may be coupled to the LAN 52 through an adapter or network interface 56 (communicatively linked to the bus 16). When used in a WAN networking environment, the computing system 10 often includes a device, such as a modem 57, a mobile phone communication module or other device for establishing communications over the WAN/Internet 54. As illustrated, a modem 57 is shown in FIG. 2 as communicatively linked between the interface 46 and the WAN/Internet/Telecommunications network 54. In a networked environment, program modules, application programs, or data, or portions thereof, can be stored in a server computer (for example, another configured computing system similar to the computing system 10). Those skilled in the relevant art will readily recognize that the network connections shown in FIG. 2 are only some examples of establishing communication links between computers and/or other systems and devices 60, and other links may be used, including wireless links. The devices may include, for example, cell phones, tablets, wireless devices, etc.

The computing system 10 may include one or more interfaces such as slot 58 to allow the addition of devices either internally or externally to the computing system 10. For example, suitable interfaces may include ISA (Industry Standard Architecture), IDE, PCI (Personal Computer Interface) and/or AGP (Advance Graphics Processor) slot connectors for option cards, serial and/or parallel ports, USB ports (Universal Serial Bus), audio input/output (I/O) and MIDI/joystick connectors, slots for memory, credit card readers, scanners, bar code readers, RFID readers, etc., collectively referenced as 60.

The term computer-readable medium as used herein refers to any medium that participates in providing instructions to processor unit 12 for execution. Such a medium may take many forms, including but not limited to, non-volatile media, and volatile media. Non-volatile media includes, for example, hard, optical or magnetic disks 25, 30, 32, respectively. Volatile media includes dynamic memory, such as system memory 14.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, as described hereinafter, or any other medium from which a computer can read.

Various forms of computer readable media may be involved in carrying one or more sequences of one or more instructions to processor unit 12 for execution. For example, the instructions may initially be carried on a magnetic disk of a remote computer. The remote computer can load the instructions into its dynamic memory and send the instructions over a telephone line using a modem. A modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processor unit 12 retrieves and executes the instructions. The instructions received by system memory 14 may optionally be stored on storage device either before or after execution by processor unit 12.

The repository 6 is a permanent storage medium for data. The repository 6 may be specific to each end user, or shared between some or all end users. For example, different services vendors or concerned parties (for example, family members or health care providers) may have separate repositories or may share repositories. The repository 6 (only one illustrated) may run on the same computing system as an application accessing the repository, or on another computing system accessible over the network 52, 54.

Embodiments of the computing system 10 of FIG. 2 may not include all of the illustrated components of the computing system 10, may contain additional components not shown in FIG. 10, and may not be configured as shown in FIG. 10. For example, a computing system 10 configured as customer system may not include an optical disk drive and may include an application specific integrated circuit or a digital signal processor (not shown) to perform one or more of the functions of the customer system. In another example, a detector or transceiver may include one or more telecommunications modules to handle call processing, such as CDMA, OFDMA, GSM, etc., call processing.

Figure 3:
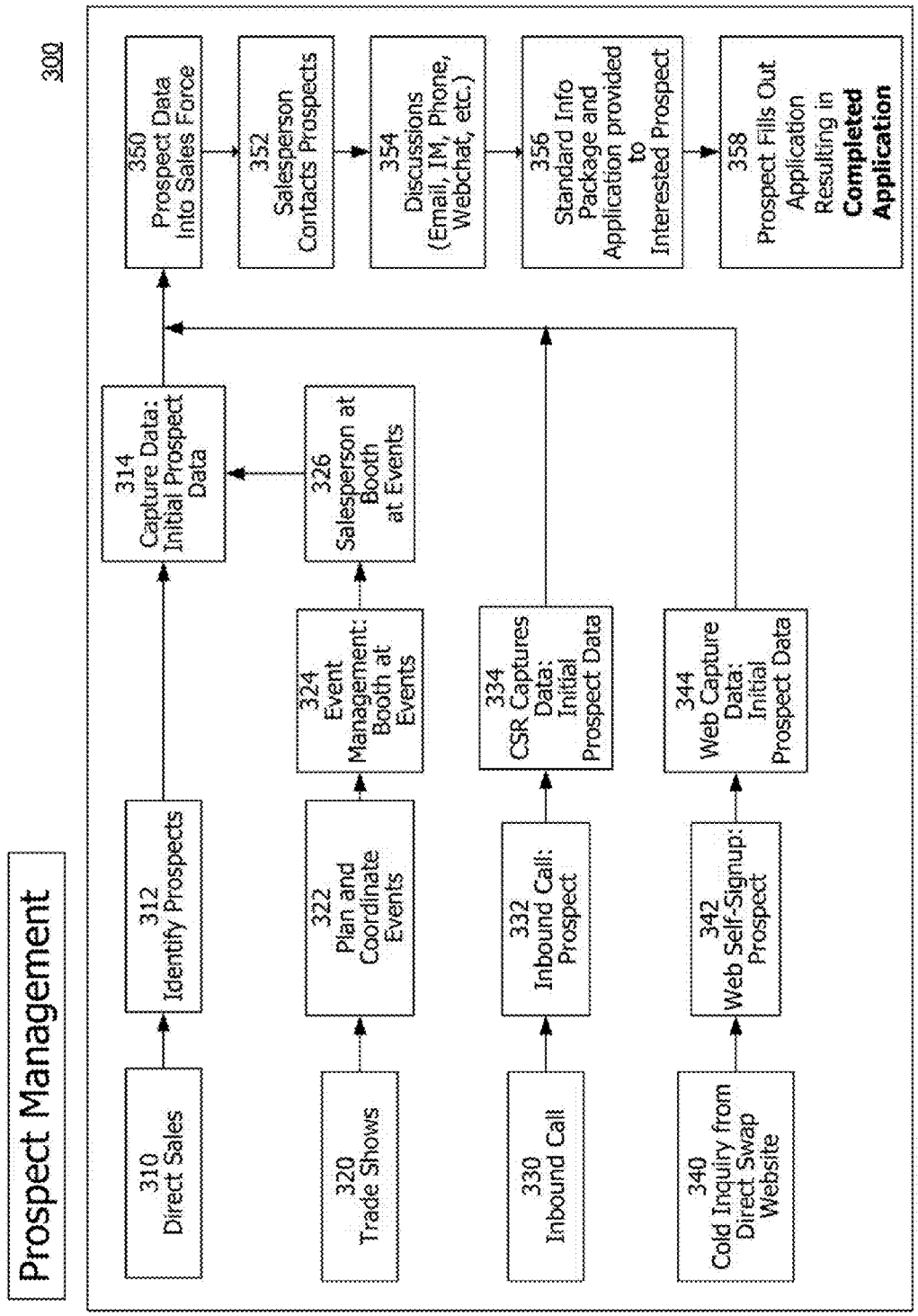
FIG. 3 is a process flow process diagram of an embodiment of a method of managing recruitment of prospective users of a derivatives transactions service.

FIG. 3 is a flow chart that illustrates an embodiment of a method 300 for managing prospective users of a derivatives transactions service.

The method 300 includes various types of processes, including direct sales, which begins at block 310. This method proceeds from block 310 to block 312 where prospects are identified. This function can be accomplished by various means, for example, including data analysis from external data sources. The method continues from block 312 to block 314, where data on prospects is collected.

Another type of process contained within method 300 relates to trade shows and begins at block 320. The method proceeds from block 320 to block 322, where trade show events are planned and organized by, for example, internal DS staff. The method continues from block 322 to block 324, where internal personnel manage booths at events. The method continues further from block 324 to block 326, where sales people at booths collect prospect data using kiosks, sales person device (for example, a smart phone) or other methods. As illustrated, the method 300 proceeds from block 326 to block 314.

Another type of process contained within method 300 relates to inbound calls and begins at block 330. The method proceeds from block 330 to block 332 where inbound calls are received and answered by DS personnel. This method continues from block 332 to block 334, where, for example, call center personnel (e.g., DS personnel) capture initial prospect data.

Another type of process contained within method 300 relates to website inquiries and begins at block 340. The method proceeds from block 340 to block 342 where prospect data entry occurs, for example via the DS public website. The method continues from block 342 to block 344, where prospect data is captured, for example from the DS pubic website.

Following the capture of prospect data, for example utilizing one of the four processes described above, the method 300 proceeds to block 350 where prospect data is entered into a customer relationship management system, such as Sales Force Customer Relationship Management System, etc. The method proceeds from block 350 to block 352 where a salesperson contacts the prospect. The method continues from block 352 to block 354, where the sales person conducts discussions with the prospect regarding the nature of their interest in the service (e.g., Direct Swap) and whether the prospect desires to become a client of the service. The method continues from block 354 to block 356 where the salesperson delivers information and an application to the prospect, for example, generally in electronic format.

Method 300 concludes at block 358, where the prospect completes and submits an application (e.g., a DS Client Application, resulting in a "Completed Application" status for that prospect.

Thus, prospect data may be automatically gathered at various acts in FIG. 3 (for example, web inquiries, inquiries at trade shows through a kiosk or sales person device (for example, a smart phone), and used to facilitate development of a prospect. A prospective user may submit a completed application, which may be electronically signed by the prospective user or applicant.

FIG. 4 is a flow chart that illustrates an embodiment of a method 400 for applicant qualification. Method 400 as illustrated contains three parts, separately labeled on FIG. 4.

The first part of method 400 is illustrated in Section A of FIG. 4, where it is determined whether an applicant is a qualified entity. The method begins with block 402 where a Completed Application from an applicant is received (for example, from the process for managing prospective users illustrated in FIG. 3). The method proceeds from block 402 to block 404 where it is determined whether the applicant is an entity subject to a regulation scheme, such as a financial institution, Major Swap Participant (MSP), Major Securities-Based Swap Participant (MSBSP), etc. If the applicant is such an entity, that information is noted for future limitations on transactions. For example, only one such entity may be permitted to participate in a transaction. The method continues from block 404 to block 406, where it is determined whether the applicant is an end-user. If not an end user, the applicant is rejected. If the applicant is an end user the method continues from block 406 to block 408, where the service (e.g., Direct Swap) verifies information provided on the Completed Application and performs other due diligence. If the applicant does not pass the verifications, the applicant is rejected. If the applicant passes the verifications and due diligence, the method continues from block 408 to block 410, where the service (e.g., Direct Swap) conducts a credit check on the applicant. If the applicant does not pass the credit check, the applicant is rejected. If the applicant passes the credit check, the method continues from block 410 to block 415, where the applicant becomes a "Qualified Entity". Once a Qualified Entity, the applicant continues with Sections B and C of FIG. 4. In some embodiments, one or more types of users may be rejected.

The second part of method 400 is illustrated in Section B of FIG. 4, where approved transaction types are determined for a qualified entity. This part of the method begins with block 420 where the nature of the qualified entity's business is identified. The method proceeds from block 420 to block 422 where the definition of hedging commercial risk is applied to the facts ascertained in block 420. Thereafter the method proceeds from block 422 to block 424 where the permitted transaction types for the Qualified Entity are determined. This method continues from block 424 to block 426, where the permitted transactions for the Qualified Entity within the service (e.g., the Direct Swap marketplace) are limited to those determined to be transactions hedging commercial risks for the entity's type of business. Various data structures may be employed to define and capture the transaction types approved for a qualified entity. This information becomes part of the Qualified Entity's user profile.

The third part of method 400 is illustrated in Section C of FIG. 4, where risk mitigation methods are determined, for example, agreed risk mitigation methods. The method begins with block 430 where a Qualified Entity selects one or more of an approved list of methods of mitigating risk. The method proceeds from block 430 to block 432 where in some embodiments, the selected methods may be periodically reviewed by the derivatives transaction service. The method proceeds from block 432 to block 434 where the risk mitigation methods types for the Qualified Entity are determined. The selected risk mitigation methods may be specified in user enrollment, for example for use by the user, including for compliance reporting.

Figure 5:
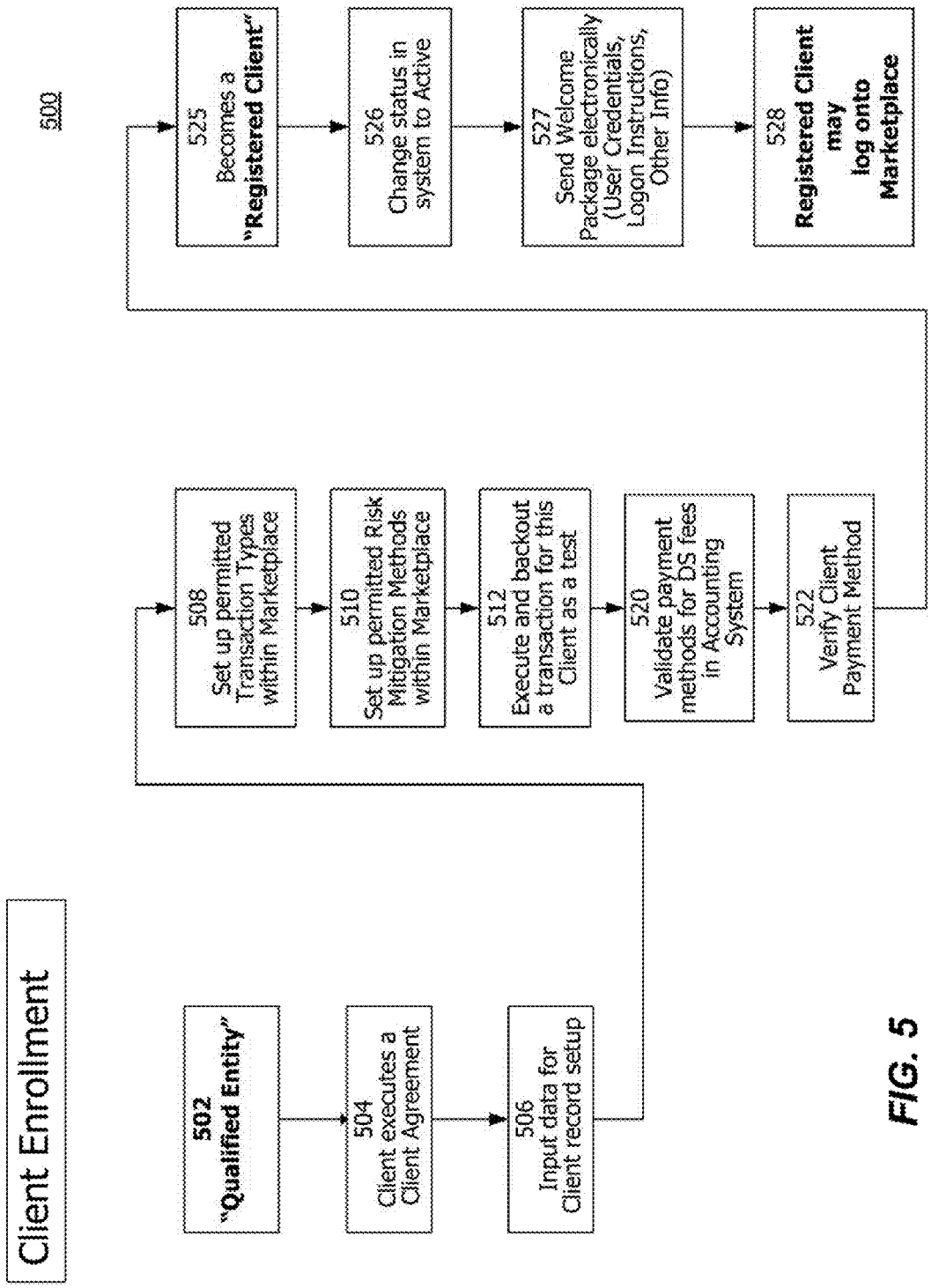
FIG. 5 is a process flow diagram of an embodiment of a method of enrolling users of a derivatives transactions service.

FIG. 5 is a process flow diagram that illustrates an embodiment of a method 500 for enrolling clients of a derivatives transactions service.

Figure 9A:
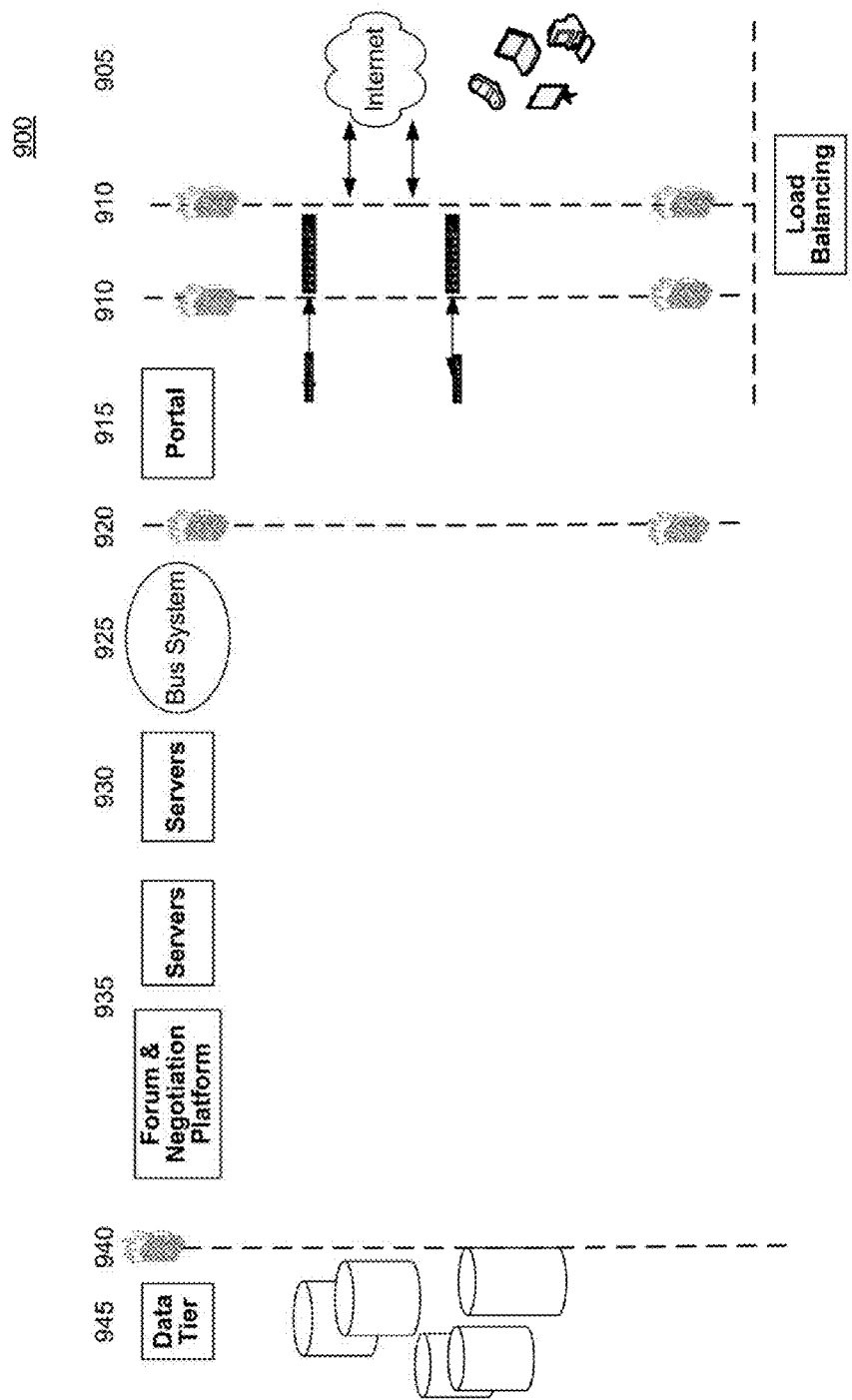
FIGS. 9A-9D are a functional block diagram of an embodiment of a derivatives transactions service system.
Figure 9B:
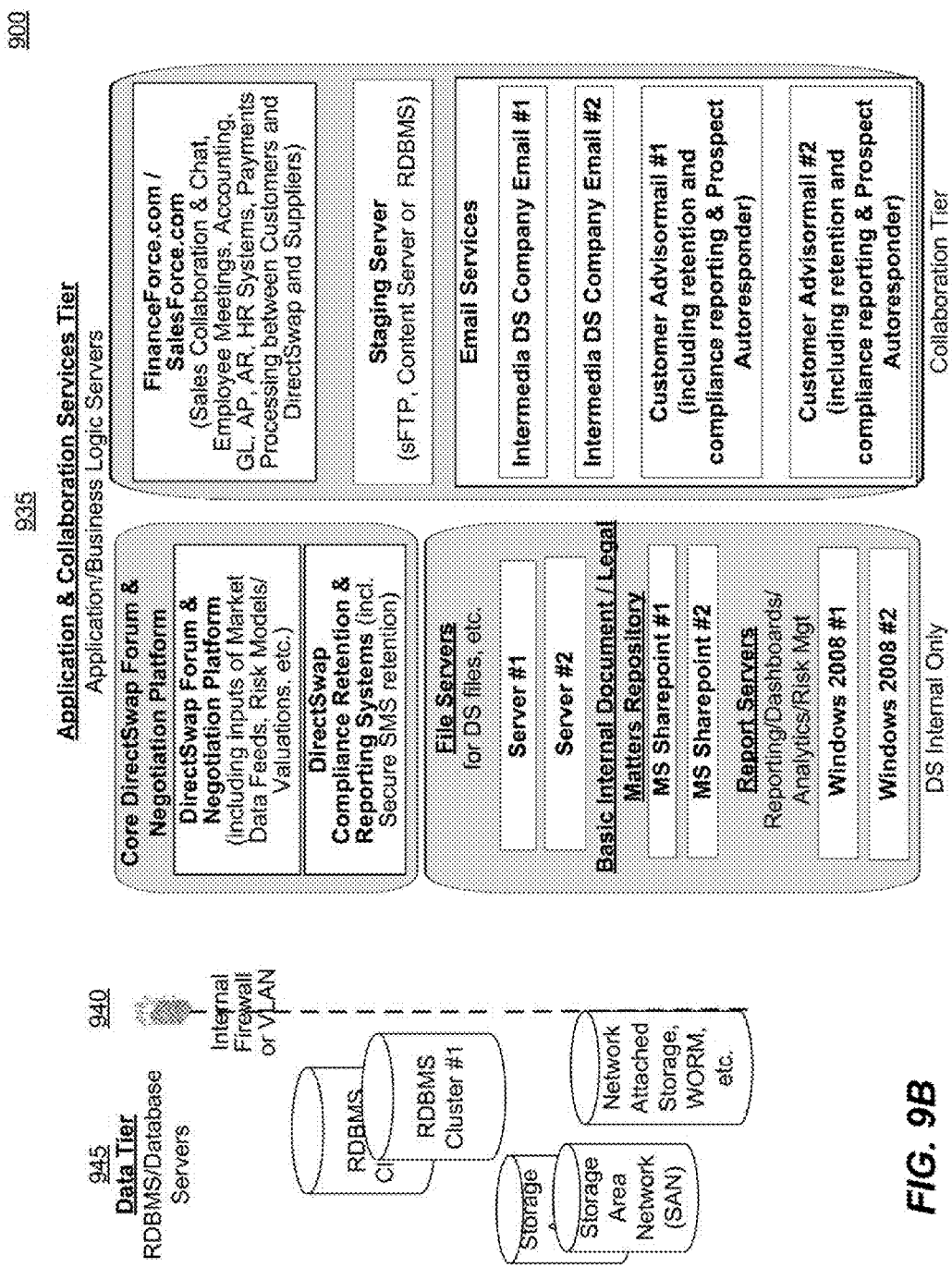
Figure 9C:
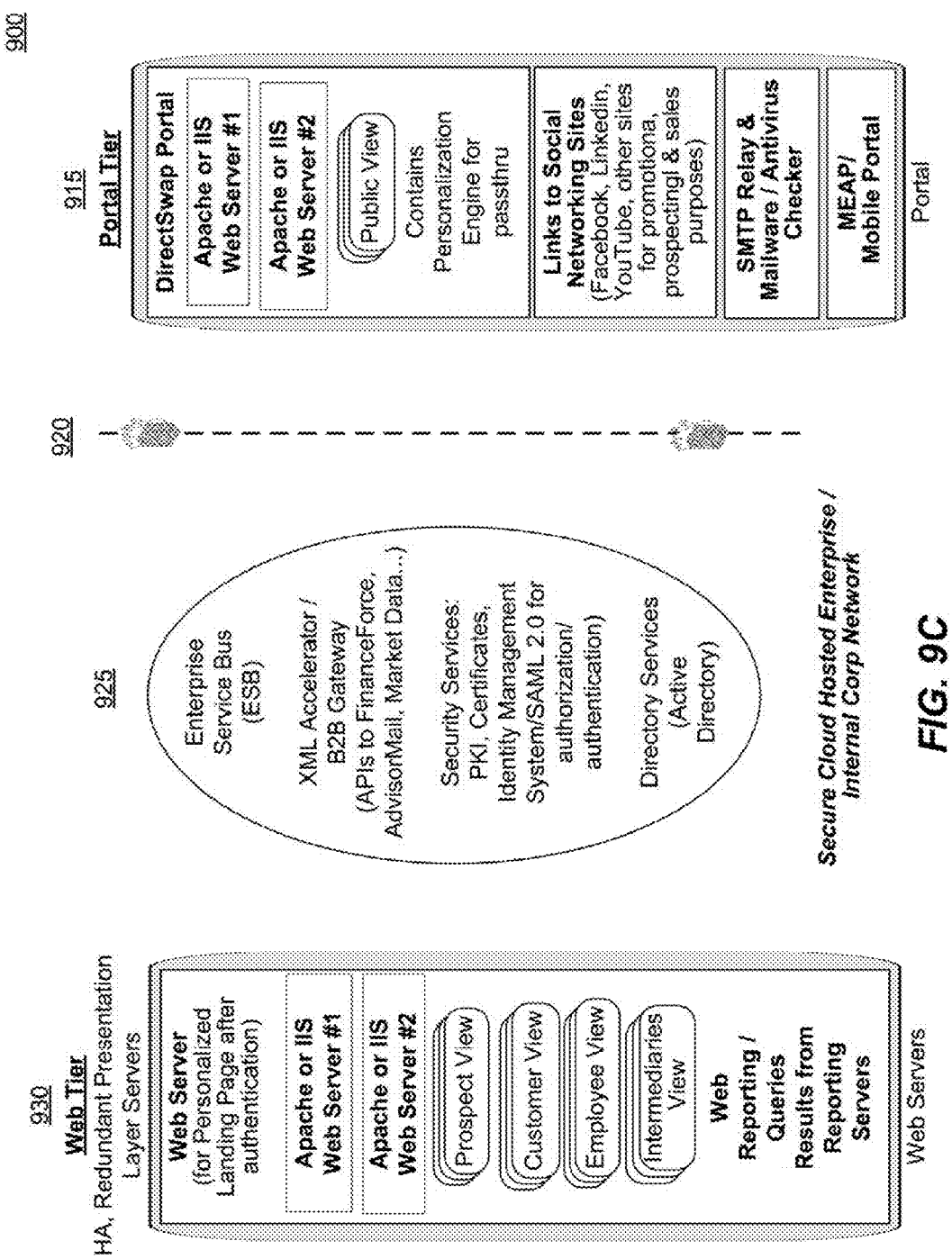
Figure 9D:
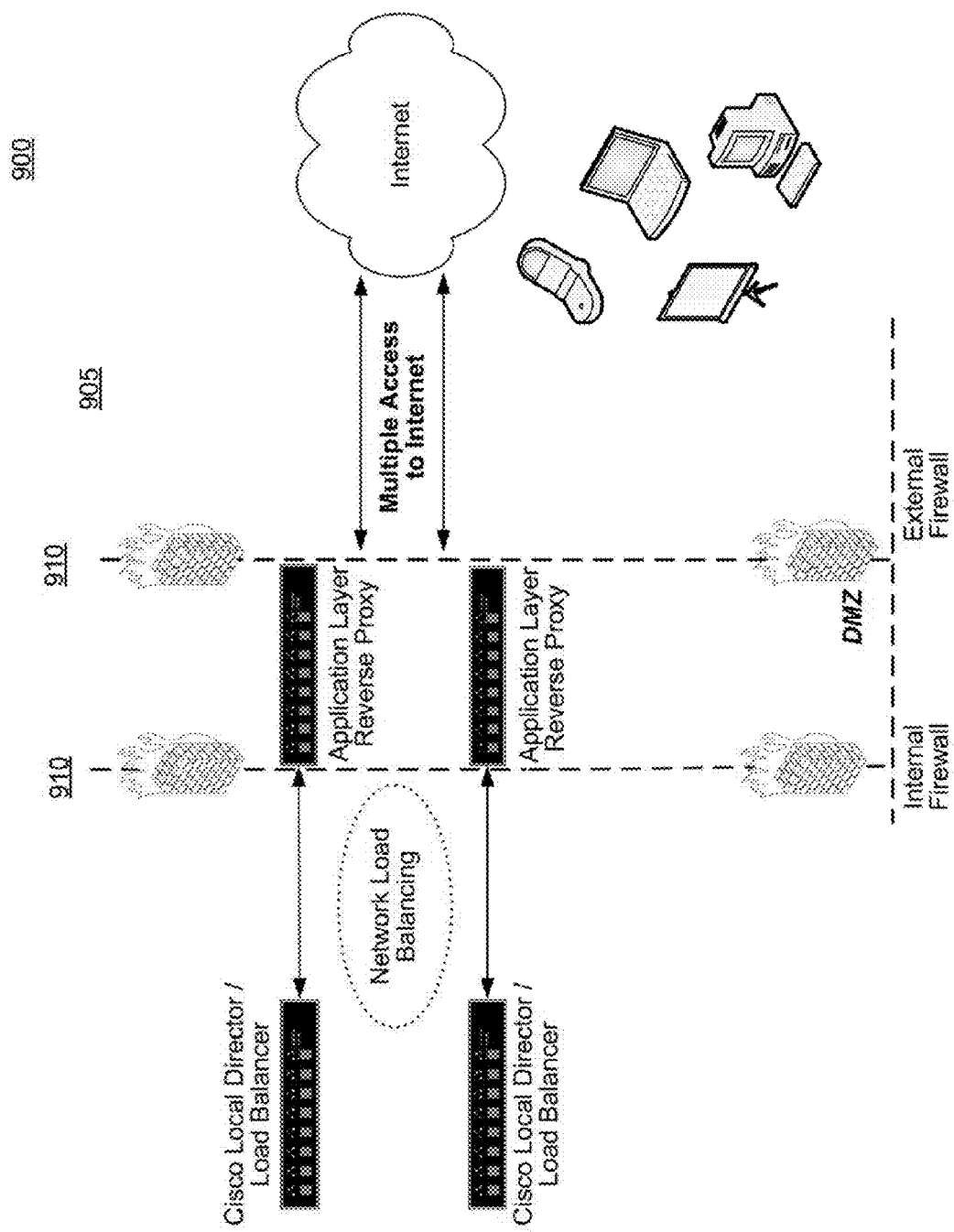

The method begins at block 502 once an applicant is deemed to be a "Qualified Entity" and continues to block 504 where the Qualified Entity executes a Client Agreement. Once the Client Agreement is executed in Block 504, the Method continues on to block 506 where a user record is created, for example automatically, manually, combinations thereof, etc. (e.g. by service personnel such as Direct Swap personnel inputting data for the user record). This information is retained, for example in data structures such as those illustrated on FIGS. 9A and 9B. The method continues on to block 508 which covers set up of the permitted transaction types for the user within the marketplace. Thereafter the method proceeds to block 510 where the permitted risk mitigation method or methods are specified for the user. The method continues to block 512 where the service (e.g., Direct Swap personnel) optionally executes and back-outs a transaction for the user as a system test.

Once the aforesaid test is complete, the method continues to block 520 where user payment methods are set up (e.g., by DS personnel in the DS accounting system). The method continues to block 522 where the user payment method is verified.

The method continues to block 525 where the "Qualified Entity" becomes a "Registered Client," for example within DS. The method continues to block 526 where the client's status in the system is changed to Active. The method continues to block 527 where a "welcome package" is electronically sent to the Client including introductory information, log on instructions and other information. The method continues to block 528, where the Registered Client may log onto the system (e.g., the Direct Swap marketplace).

Figure 6A:
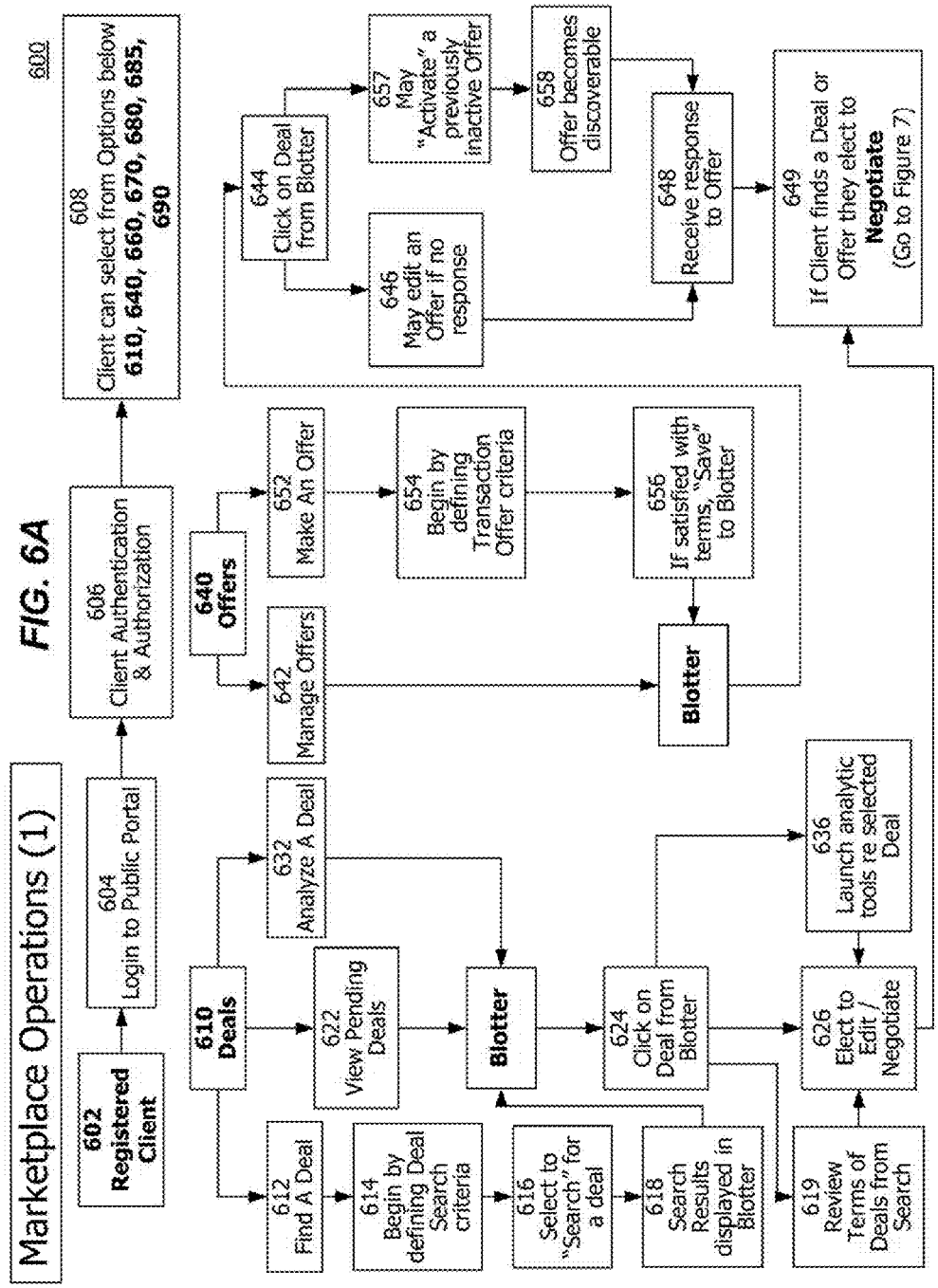
FIGS. 6A, 6B and 7 are process flow diagrams of an embodiment of a method of operating a derivatives transactions service.
Figure 6B:
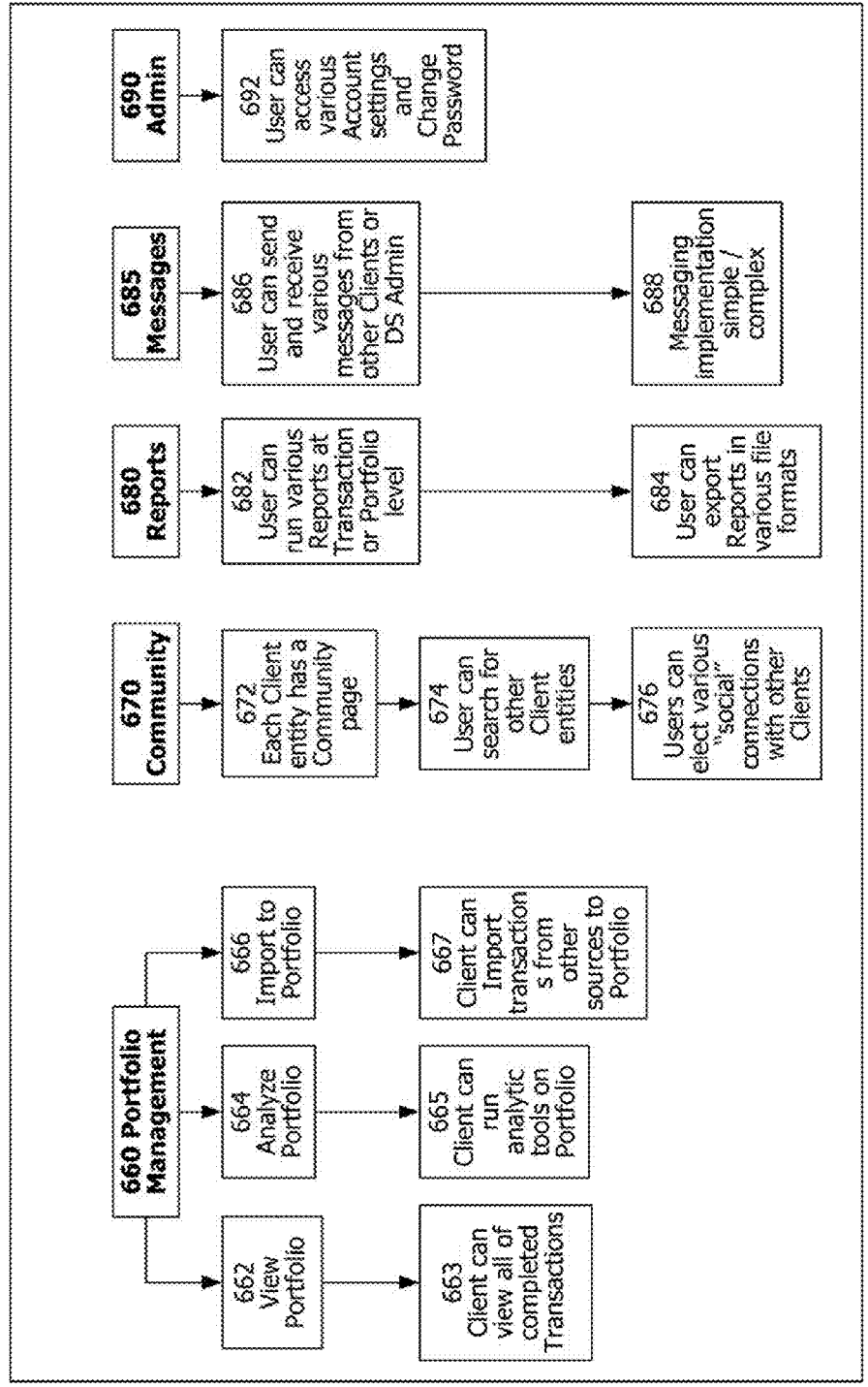
Figure 7:
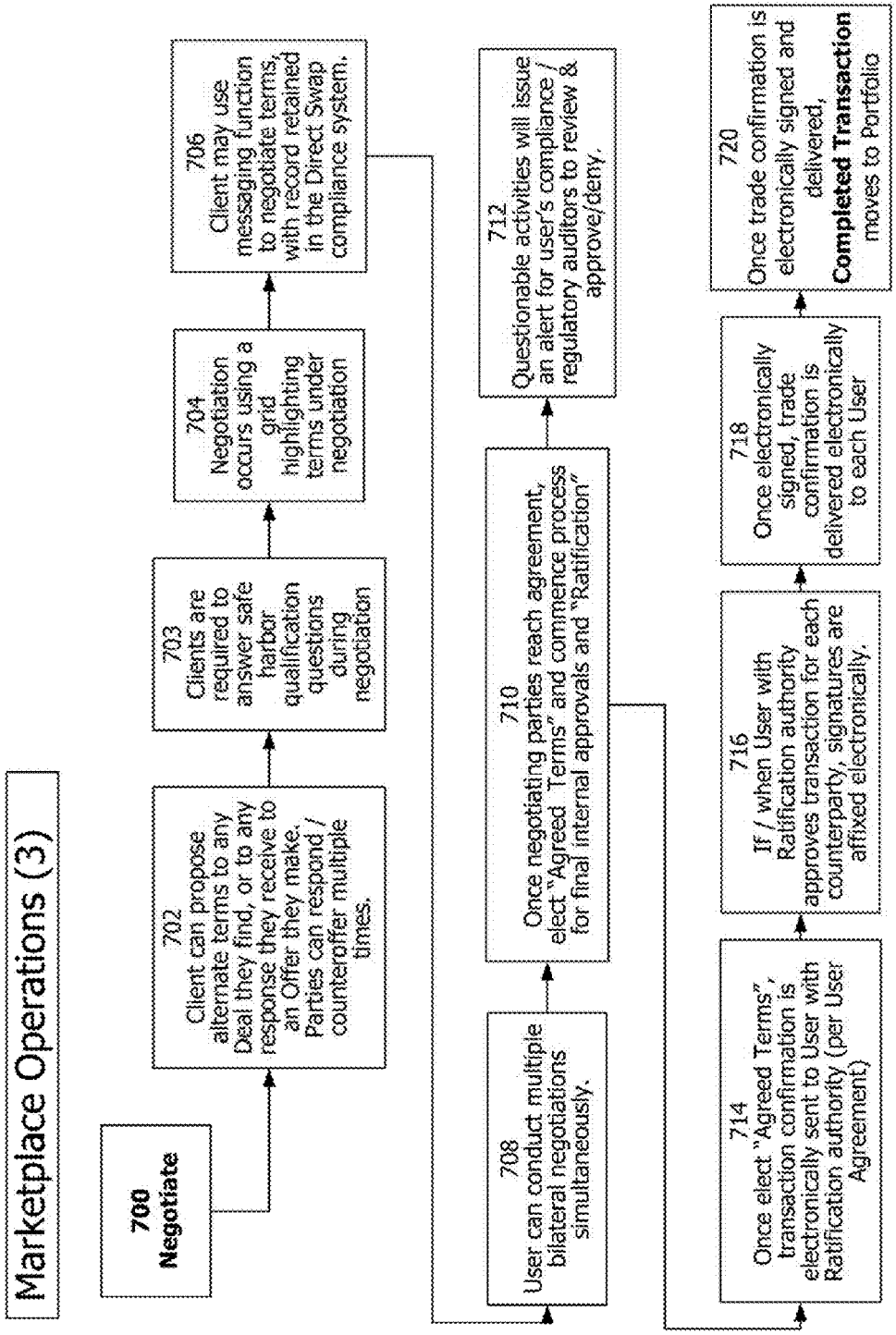

FIGS. 6A, 6B and 7 are process flow diagrams of an embodiment of a method 600 of operating a derivatives transaction service.

The embodiment of method 600 illustrated in FIGS. 6A, 6B and 7 begins at block 602 with a Registered Client, and continues to block 604 where a user on behalf of the Registered Client may log on to the service, for example, via a public portal. The method continues to block 606 where the user is authenticated and a personalized portal is presented to the user. The method continues to block 608, where the user can select from the various options provided by the service, such as those illustrated at blocks 610, 640, 660, 670, 680, 685 or 690. These options are described below, and may include branches from one option to another option. Other options may be presented to the user, such as conducting general research. For example, the user may access real-time market data and historical research for a type of derivative or industry, the user may select from different risk models appropriate to a type of derivative, the user may perform if/then/else scenarios on various derivatives given changes to data metrics, the user on-line assistance from the system or from representatives of the system, etc., and various combinations thereof. The other options may include branches, such as a branch to block 610.

If the user selects "Deals" in block 608, the method continues at block 610. From block 610 the user is offered three choices, described in detail below.

The user may elect to "Find a Deal" beginning at block 612. If selected, the method continues from block 612 to block 614 where the user defines deal search criteria within determined fields, which may be pre-determined. Once the search criteria are defined, the method continues on to block 616 where the user may select "search", which may, for example, activate a search query within a database access to which is offered by the service, using the criteria specified in block 614. After the search is performed, the method continues on to block 618, where the search results are displayed, for example in a Blotter (e.g., a transaction aggregation grid). From the Blotter display, the method continues with block 624 if the user clicks on a deal within the Blotter for review. In this configuration, the method continues on to block 619 where the deal terms are displayed. If desired by the user, the user may elect to negotiate the deal by proposing alternate terms. In that instance the method continues on to block 700 entitled Negotiate (see FIG. 7).

The user may elect to "View Pending Deals" beginning at block 612. If this option is selected, the method continues directly to the Blotter. From the Blotter display, the method continues with block 624 where the user clicks on a deal within the Blotter for review. In this configuration, the method continues on to block 626 where the user may elect to negotiate the deal by proposing alternate terms. In that instance the method continues on to block 700 "Negotiate" (see FIG. 7).

The user may elect to "Analyze a Deal" beginning at block 632. If this option is selected, the method continues directly to the Blotter. From the Blotter, the method continues on to block 636 where the user can launch various analytic tools to perform analysis on the deal selected. From that analysis the user may elect to negotiate the deal by proposing alternate terms. In that instance the method continues on to block 700 "Negotiate".

If the user selects "Offers" the method continues at block 640. From block 640 the user is offered two choices.

The user may elect to "Make An Offer" beginning at block 652. The method continues from block 652 to block 654 where the user defines deal offer criteria within determined fields, which may be pre-determined. Once completed, the method continues to block 656 where the user may elect to save the offer to the Blotter. Once the offer is saved to the Blotter, the method continues to block 644 where the user may select a deal. From block 644 the method continues to block 657 where the user may elect to "activate" the offer to the intended offerees within the service (e.g., the Direct Swap marketplace). Following activation in Block 657, the method continues to Block 658 where the offer becomes discoverable by the intended recipients within the service (e.g., Direct Swap marketplace). Once the offer is discoverable, the method continues to Block 648 where a response may be received by the Client to the offer. The method continues on to block 649 where the user may elect to negotiate the deal by proposing alternate terms. In that instance the method continues on to block 700 "Negotiate".

The user may elect to "Manage Offers" beginning at block 642. If selected, the method continues directly to the Blotter. From the Blotter display, the method continues with block 644 where the user clicks on a deal within the Blotter the user desires to review. The method continues on to Block 646, where the user may edit an offer which has not yet received a response. The method continues further to Block 648 where a response may be received by the Client to the offer. The method continues on to block 649 where the user may elect to negotiate the deal by proposing alternate terms. In that instance the method continues on to block 700 "Negotiate".

If the user selects "Portfolio" the method continues at block 660. From block 660 the user may select from three choices.

The user may elect to "View Portfolio" beginning at block 662. If selected, the method continues from block 662 to block 663 where the user can see a listing of all of their completed transactions.

The user may elect to "Analyze Portfolio" beginning at block 664. If selected, the method continues from block 664 to block 665 where the user may launch various analytic tools to analyze their portfolio.

The user may elect to "Import to Portfolio" beginning at block 666. If selected, the method continues from block 666 to block 667 where the user can import files containing transaction data from sources outside the service (e.g., outside Direct Swap) directly into their portfolio.

If the user selects "Community" the method continues at block 670. The method begins at block 672, where each user is allowed to set up their own "Community" page. The method continues from block 672 to block 674, where users are allowed to search for other user entities using various criteria and database queries. The method concludes with block 676 where the user may elect various other social media connections with other users.

If the user selects "Reports" the method continues at block 680. The method begins at block 682, where each user is allowed to select various types of determined or custom defined reports at the transaction or portfolio level. The method continues from block 682 to block 684, where users can export reports from the service (e.g., Direct Swap) in various file formats such as CSV, PDF, or secure web services (e.g., using XML), etc. The user's treasury officer, compliance officer, etc., may survey/obtain reports.

If the user selects "Messages" the method continues at block 685. The method begins at block 686, where the user can send and receive messages from other user entities within the service (e.g., Direct Swap). The method continues from block 686 to block 688, where the messaging is implemented such as by calling a subroutine, another service, etc. (e.g., simple email functions, more robust formats such as eMeetings, etc.).

If the user selects "Admin" the method continues at block 690. The method begins at block 692, where the user can access various account settings and change their password.

Embodiments of the method 600 may provide additional functionality, less functionality, and or provide functionality in orders other than as described above. For example, a user may prepare a transaction offer using a matrix of transaction criteria within a scope permitted for the user. The user may submit the transaction offer for internal approvals, as necessary. The user's treasury department, risk officer, etc., may be asked to approve or deny the offer. If the necessary approvals are obtained, the offer may be made available to other users of the system as appropriate.

FIG. 7 illustrates an embodiment of a method of providing a negotiation service in an embodiment of a derivatives transactions service.

The method 700 begins at block 702 where a user may elect to propose alternate terms to any Deal they Find, or respond to any Offer they receive, varying any or all of the criteria. The process may be iterative. The method continues to Block 703, where the Client is asked to answer safe harbor qualification questions during the negotiation. For example, the client may be asked questions in order to determine whether the transaction is economically appropriate in the conduct of the client's business, whether the transaction is exempt from position limits under the Commodities Exchange Act, whether the transaction qualifies for hedging treatment under FASB 815, whether the transaction is being used for speculation or trading, whether the transaction is being used to hedge the risk of another swap, etc. Other actions may be taken to determine whether a transaction qualifies for a safe-harbor, such as verifying response to questions, etc.

The method continues to block 704 where the user may use, for example, a grid display format to identify and select transaction terms to negotiate. From block 704 the method continues to block 706, where users may also use the messaging function to negotiate transactions. The method continues to block 708, indicating the user may conduct multiple bilateral negotiations simultaneously.

The method continues from block 708 to block 710, where the parties negotiating indicate an agreement as to terms has been reached, for example by each party selecting an "Agreed Terms" button. From block 710 the method continues to either block 712 or block 714. At block 712, the system may monitor client activities to detect questionable activities based on various criteria and issue an alert if a questionable activity is detected. Regulatory auditors may then review and approve or deny the transaction. At block 714, the draft transaction confirmation is electronically sent to certain individuals with "Ratification" authority for the client user. A user's treasury department, risk officer, etc., may approve or deny a transaction or may request additional documentation or modifications, etc. If the individual with "Ratification" authority approves the transaction, the method continues to block 716 where signatures are electronically affixed to the transaction confirmation.

The method continues to block 718, where the signed trade confirmation is delivered electronically to each user entity. The method continues to block 720, where the Completed Transaction is moved into the user entity's Portfolio.

As noted above, additional functionality may be employed in some embodiments. Users may have electronic interactions such as electronic meetings, secure chat sessions, etc., to negotiation terms which are then retained by the derivatives transactions service. Specialized services may be made available for particular types of transactions. For example, if the potential transaction is for commodities, the parties to the transaction may review and negotiate storage, shipping/delivery, timing, terms and conditions, returns/reversals, etc., as defined by the derivatives transactions service. Users may select and compare various offers if negotiating with multiple parties. Users may be required by the model for a company to model the risk of a potential transaction before it is executed, for example based on such factors as real-time currency exchange rates, a real-time credit balance check regarding the other party's ability to complete the transaction, etc. When a fully negotiated transaction offer receives internal company approvals, electronic confirmation may be sent to the parties to the transaction for final approval.

Figure 8:
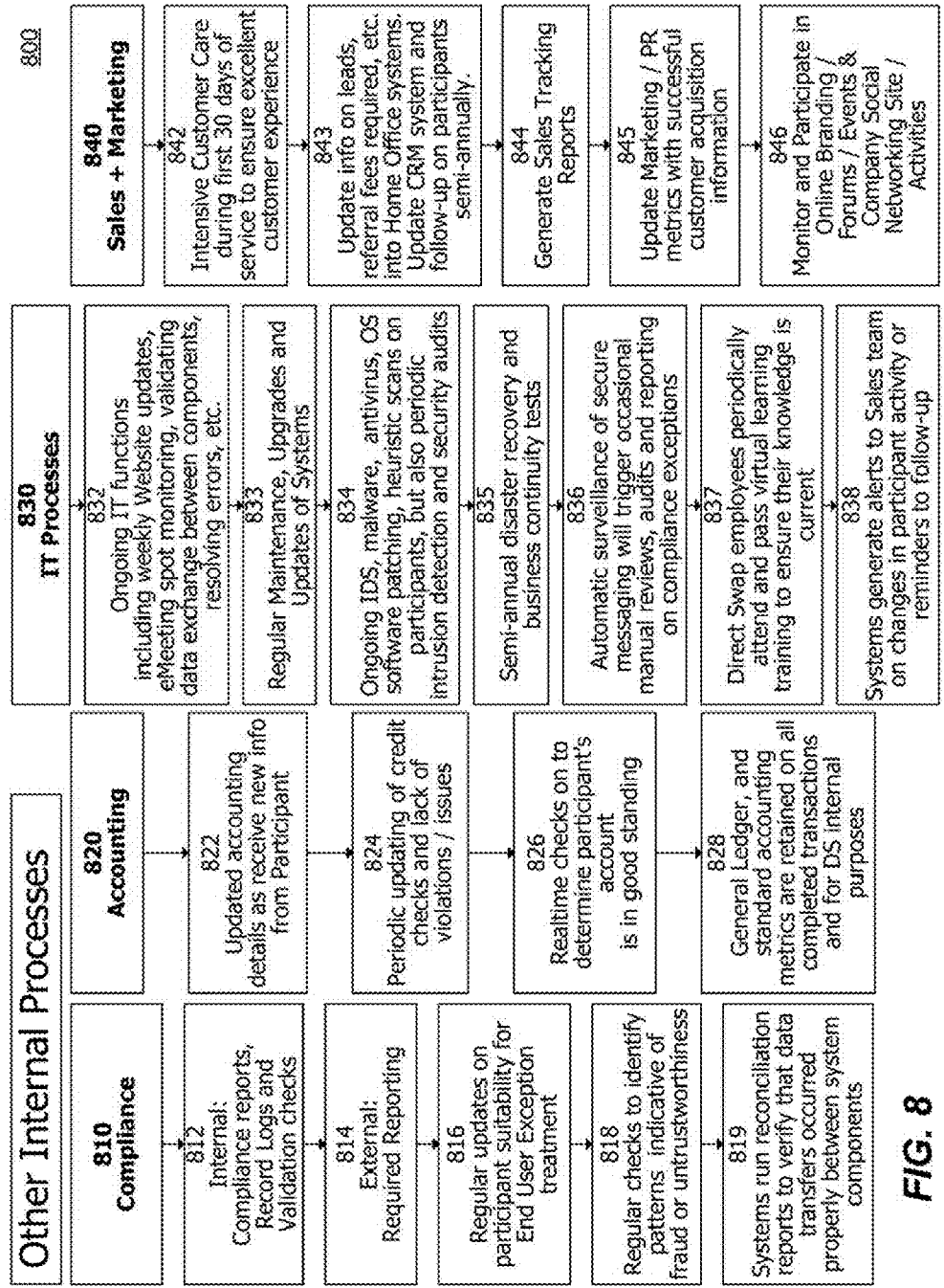
FIG. 8 is a process flow diagram illustrating other processes of an embodiment of method of operating a derivatives transactions service.

FIG. 8 is a high-level flow process diagram illustrating other processes of an embodiment of method 800 of operating a derivatives transaction service. The method 800 begins by describing example embodiments of various other internal processes at blocks 810, 820, 830 or 840.

The example process "Compliance" begins at block 810. The method continues to block 812, where internal compliance reports of the transaction service are generated, records are logged and validation checks are performed. The method continues on to block 814, where external reporting such as regulatory compliance reporting to swap data repositories (e.g., compliance reporting under the Dodd-Frank act, etc.) and reporting to users as appropriate is performed. The method continues to block 816 where regular checks may be made to ensure participants are still suitable for the particular types of transactions (for example that a user still qualifies for a regulatory exception, such as the EUCE). The method continues to block 818 where regular checks may be run to identify trading patterns which might be indicative of fraud or untrustworthiness. The method continues to block 819 where the system runs reconciliation/delta reports to verify that the data feeds occurred properly between various components of the derivatives transaction system.

The example process "Accounting" begins at block 820. The method continues to block 822 where the service may verify accounting details entered on behalf of a user from an application or an agreement, and update such details, for example when informed of a change by the user. The method continues to block 824 where the system may run periodic checks to ensure ongoing credit worthiness of a user and lack of violations or other issues with a user. The method continues to block 826 where real-time checks may be made to determine if the users account is in good standing. The method continues to block 828 where general ledger and standard accounting metrics may be retained on completed transaction, for example for internal use by the service.

The example process "IT Processes" begins at block 830. The method continues at block 832 to describe various periodic IT functions such as website updates, regular maintenance, etc. The method continues at block 833 to describe regular maintenance upgrades and updates of system. The method continues at block 834 to describe ongoing intrusion protection and security audits. The method continues at block 835 with periodic (e.g., semi-annual) disaster recovery and business continuity tests. The method continues at block 836 with automatic surveillance of messaging for fraud detection. The method continues at block 837 requiring service (e.g., Direct Swap) employees to attend periodic training. The method continues at block 838 where the system generates alerts to the Sales Team on changes in participant activity or reminders for follow-up.

The example process "Sales+Marketing Processes" begins at block 840. The method continues at block 842 with intensive customer care during the first 30 days of service. The method continues at block 843 where the system updates information on leads, referral fees and other matters into home office systems. The method continues to block 844 where systems periodically generate sales tracking reports. The method continues to block 845 where marketing and PR metrics are updated with information from customer acquisitions. The method continues to block 846 where personnel participate in various online forums, events and social media and networking activities.

FIGS. 9A-9D are a functional block diagram of an embodiment of system 900 suitable for providing derivatives transactions services. As illustrated, the system comprises the functional areas discussed below.

Beginning at Block 905, the user may access the system through multiple access points to external networks (including the internet).

Coming through the access points in Block 905, user traffic continues to and through Block 910 which may contain an external firewall, internal firewall and network load balancing equipment.

At block 915, the portal tier, the user may log onto the system. After proffering credentials the user may be authenticated. As the user navigates through the site, various commands from the portal tier elicit responses through the enterprise service bus at Block 925. As illustrated, an internal firewall 920 is employed.

Presentation functions, including creation of a personalized landing page appropriate for the user, are handled by the web tier at Block 930.

In response to user activity creating system commands, various functions may be called up at the application and collaboration services tier in Block 935. Those functions may range from internal transaction negotiation or reporting to collaboration with Sales Force or external applications. The functions may also call on data structures contained in the data tier at Block 945. As illustrated, another internal firewall or VLAN is employed.

The system of FIGS. 9A-9D may be configured to provide the various functionality described herein with respect to embodiments of methods of providing derivatives transactions services.

Embodiments of methods described or illustrated herein may contain additional acts not described or shown in the figures, may not contain all of the acts described or shown in the figures, may perform acts described or shown in various orders, and may be modified in various respects.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof. For example, embodiments of a hedge transaction facilitating system may be implemented as discussed above (e.g., partially in hardware, partially with controllers executing instructions, etc.).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
one or more memories; and
one of more processing devices coupled to the one or more memories and configured to automatically provide a derivatives transactions service, the automatically providing the derivatives transaction service including:
qualifying prospective users of the service based on a user type and credit evaluation;
determining approved transaction types for qualified users;
identifying approved risk mitigation methods for qualified users;
enrolling qualified users in the service; and
providing to a qualified user at least one of:
transaction search services;
transaction offer services;
portfolio management services; and
transaction negotiation services.

2. The system of claim 1 wherein providing the derivative transaction service includes providing a private marketplace to qualified users to conduct transactions.

3. The system of claim 2 wherein providing the private market place includes providing credit support due diligence services.

4. The system of claim 1 wherein providing the derivative transaction service includes selectively providing a qualified user with an indication of information related to a counter party of a potential transaction.

5. The system of claim 1 wherein providing the derivative transaction service includes providing due diligence services.

6. The system of claim 2 wherein providing the private marketplace comprises providing social connection services to users of the private marketplace.

7. The system of claim 1 wherein providing the derivative transaction service comprises providing online access to the derivative transaction service.

8. The system of claim 1, comprising verifying compliance with an End User Clearing Exception (EUCE).

9. The system of claim 8 wherein the verifying compliance with the EUCE comprises verifying a transaction is exempt from clearing and margin requirements.

10. The system of claim 1 wherein providing the derivative transaction service comprises generating reports.

11. The system of claim 10 wherein the generating reports includes generating reports to comply with an End User Clearing Exception (EUCE).

12. The system of claim 1 wherein providing the derivative transaction service comprises providing collateral management services and analytic tools.

13. A computer implemented method of providing a derivatives transaction service, the method comprising:
qualifying prospective users of the service based on a user type and credit evaluation;
determining approved transaction types for qualified users;
identifying approved risk mitigation methods for qualified users;
enrolling qualified users in the service; and
providing to a qualified user at least one of:
transaction search services;
transaction offer services;
portfolio management services; and
transaction negotiation services, wherein the qualifying, the determining, the enrolling and the providing are performed by one or more configured computing systems.

14. The method of claim 13 wherein providing the derivative transaction service includes providing a private marketplace to qualified users to conduct transactions.

15. The method of claim 14 wherein providing the private market place includes at least one of providing credit risk analysis services and providing social connection services to users of the private marketplace.

16. The method of claim 13 wherein providing the derivative transaction service includes selectively providing a qualified user with information related to a counter party of a potential transaction.

17. The method of claim 16 wherein the information includes an indication of an identity of the counter party.

18. A non-transitory computer-readable medium whose contents cause a computing system to perform a method, the method comprising:
qualifying prospective users of a derivatives transaction service based on a user type and credit evaluation;
determining approved transaction types for qualified users;
identifying approved risk mitigation methods for qualified users;
enrolling qualified users in the service; and
providing to a qualified user at least one of:
transaction search services;
transaction offer services;
portfolio management services; and
transaction negotiation services.

19. The non-transitory computer-readable medium of claim 18 wherein the contents are instructions which configure at least one processing device of the computing system to perform the method.

20. The system of claim 1 wherein the providing the derivatives transaction service includes providing bilateral negotiation services.

21. The system of claim 1 wherein the providing the derivatives transaction service includes providing a client portal directly accessible via the Internet.

22. The method of claim 13 wherein the providing the derivatives transaction service includes providing bilateral negotiation services.

23. The method of claim 13 wherein the providing the derivatives transaction service includes providing a client portal directly accessible via the Internet.

* * * * *